(12) United States Patent
Bruck et al.

(10) Patent No.: US 8,225,287 B2
(45) Date of Patent: Jul. 17, 2012

(54) METHOD FOR TESTING A SYSTEM

(75) Inventors: Lewis S. Bruck, Redmond, WA (US); Ranjani Ramamurthy, Bellevue, WA (US); Tao Di, Newcastle, WA (US); Shriram Lakshmi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1526 days.

(21) Appl. No.: 11/717,271

(22) Filed: Mar. 13, 2007

(65) Prior Publication Data
US 2008/0228805 A1 Sep. 18, 2008

(51) Int. Cl.
*G06F 9/44* (2006.01)

(52) U.S. Cl. .......................... 717/124; 717/125; 717/126

(58) Field of Classification Search .................. None
See application file for complete search history.

(56) References Cited

U.S. PATENT DOCUMENTS

| | | | |
|---|---|---|---|
| 618,224 A | 1/2001 | Akin et al. | |
| 635,389 A1 | 3/2002 | Nock et al. | |
| 651,040 A1 | 1/2003 | Logan et al. | |
| 665,491 A1 | 11/2003 | Miles | |
| 685,992 A1 | 2/2005 | Baker et al. | |
| 705,506 A1 | 5/2006 | DiJoseph | |
| 712,440 A1 | 10/2006 | Muller et al. | |
| 7,240,268 B2 * | 7/2007 | Wrigley et al. | 714/739 |
| 7,409,603 B2 * | 8/2008 | Shu et al. | 714/45 |
| 2002/0161700 A1 * | 10/2002 | Ernst et al. | 705/38 |
| 2004/0123272 A1 * | 6/2004 | Bailey et al. | 717/125 |
| 2004/0153837 A1 | 8/2004 | Preston et al. | |
| 2005/0240841 A1 * | 10/2005 | Lin | 714/724 |
| 2006/0129891 A1 | 6/2006 | Padisetty et al. | |
| 2006/0195817 A1 * | 8/2006 | Moon | 717/104 |
| 2007/0016829 A1 | 1/2007 | Subramanian et al. | |
| 2007/0022407 A1 | 1/2007 | Givoni et al. | |
| 2007/0079189 A1 * | 4/2007 | Jibbe | 714/724 |
| 2007/0136024 A1 * | 6/2007 | Moser et al. | 702/119 |
| 2007/0174713 A1 * | 7/2007 | Rossi et al. | 714/38 |
| 2007/0220392 A1 * | 9/2007 | Bhaumik et al. | 714/742 |
| 2008/0155343 A1 * | 6/2008 | Branca et al. | 714/38 |
| 2008/0184206 A1 * | 7/2008 | Vikutan | 717/127 |
| 2009/0300585 A1 * | 12/2009 | Meenakshisundaram et al. | 717/124 |
| 2009/0307665 A1 * | 12/2009 | Sharma et al. | 717/124 |

OTHER PUBLICATIONS

Mantyniemi, et al., "A Process Model for Developing and Utilizing Reusable Test Assets", Date: Oct. 11, 2005, pp. 59, http://www.tt-medal.org/results/download/work1/D.1.3.2.v2.0.FINAL.AProcessModelForDevelopingAndUtilizingReusableTestAssets_PUB.pdf.

Mayrhauser, et al., "Domain Based Testing: Increasing Test Case Reuse", Date: Dec. 10, 1993, http://citeseer.ist.psu.edu/cache/papers/cs/2732/http:zSzzSzwww.cs.colostate.eduzSz~ftppubzSzTechReportszSz1993zSztr-131.pdf/vonmayrhauser93domain.pdf.

* cited by examiner

*Primary Examiner* — Insun Kang

(57) ABSTRACT

In a method for testing a system, the technology initially accesses a database having a plurality of stand-alone pieces-of-code. Each piece-of-code includes a sequence of operations to be performed on a system. One or more of a plurality of stand-alone pieces-of-code within a database are selected to generate a set of at least two stand-alone pieces-of-code, based on a testing scenario. A variable test sequence from a set of at least two stand-alone pieces-of-code is then generated. The variable test sequence is then utilized to test a system based on a testing scenario.

20 Claims, 6 Drawing Sheets

300

```
┌─────────────────────────────────────────────┐
│ Access a database having a plurality of     │
│ stand-alone pieces-of-code, wherein each    │
│ piece of code includes a sequence of        │
│ operations to be performed on a system      │
│                    305                      │
└─────────────────────────────────────────────┘
                      │
                      ▼
┌─────────────────────────────────────────────┐
│ Select one or more of a plurality of        │
│ stand-alone pieces-of-code within said      │
│ database to generate a set of at least two  │
│ stand-alone pieces-of-code, based on a      │
│ testing scenario                            │
│                    310                      │
└─────────────────────────────────────────────┘
                      │
                      ▼
┌─────────────────────────────────────────────┐
│ Generate a variable test sequence from the  │
│ set of at least two stand-alone             │
│ pieces-of-code                              │
│                    315                      │
└─────────────────────────────────────────────┘
                      │
                      ▼
┌─────────────────────────────────────────────┐
│ Utilize a variable test sequence to test a  │
│ system based on a testing scenario          │
│                    320                      │
└─────────────────────────────────────────────┘
```

```
┌─────────────────────────────────────────┐
│ Segment a sequence of operations into a │
│ plurality of stand-alone pieces of      │
│ code, wherein a stand-alone             │
│ piece-of-code is configured to operate  │
│ with at least one other stand-alone     │
│ piece-of-code                           │
│                  405                    │
└─────────────────────────────────────────┘
                    │
                    ▼
┌─────────────────────────────────────────┐
│ Determine a class type of at least one  │
│ of a plurality of stand-alone           │
│ pieces-of-code based upon a             │
│ functionality of stand-alone            │
│ pieces-of-code                          │
│                  410                    │
└─────────────────────────────────────────┘
                    │
                    ▼
┌─────────────────────────────────────────┐
│         Store stand-alone pieces-of-code│
│                  415                    │
└─────────────────────────────────────────┘
                    │
                    ▼
┌─────────────────────────────────────────┐
│ Utilize a stand-alone pieces of code    │
│ selector to access a database such that │
│ said stand-alone pieces-of-code         │
│ selector may select at least some       │
│ number of stand-alone pieces-of-code    │
│ based on a system testing scenario in   │
│ order to define a testing condition     │
│                  420                    │
└─────────────────────────────────────────┘
```

FIG. 4

METHOD FOR TESTING A SYSTEM

BACKGROUND

Presently, two major methods of testing a computing system are that of static and dynamic testing. In static testing, a sequence of operations is specifically selected. A number of expected reactions are determined. A selected sequence of operations is then executed, and the tester verifies that observed reactions match the expected reactions. Static tests are relatively easy to write and usually are the first type of testing done.

In dynamic testing, a code's reaction to variables that change with time is examined. Two types of dynamic testing are stochastic testing and model-based testing. In stochastic testing, a sequence of operations is randomly selected, executed against a system, and the reactions are observed. The system under test typically passes individual tests, but the goal of stochastic testing is to see if the system can pass a large number of individual tests.

Model-based testing allows for a more focused method than that of stochastic testing. In model-based testing, a large number of sequences of operations are randomly selected according to what operations are likely or possible based on previous operations. These operations are then executed against a system, and the reactions are observed. Generally, model-based testing applies tests randomly selected from all possible sequences of operations within a system's search space to a system.

There exist many limitations though to the current state of technology with respect to testing systems. While static tests are easy to write, they are difficult to keep up-to-date due to the rapid increase in the demand for enhanced tests. Another limitation to static testing is the pesticide paradox problem, wherein only the bugs in the code covered by the static tests are found and fixed. Problems that might be found by a large number of randomly selected tests, such as is done in stochastic testing, may be missed.

While stochastic testing may address the pesticide paradox problem, it also has its limitations. For example, while stochastic testing randomly selects a large number of sequences of operations to execute, this method is not very focused. Additionally, while the refined model-based testing allows for a more focused test, it involves a very broad search space, parts of which may be tested unnecessarily.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for testing a system is disclosed. The technology initially accesses a database having a plurality of stand-alone pieces-of-code, wherein each piece-of-code includes a sequence of operations to be performed on a system. One or more of a plurality of stand-alone pieces-of-code within a database are selected to generate a set of at least two stand-alone pieces-of-code, based on a testing scenario. A variable test sequence from a set of at least two stand-alone pieces-of-code is then generated. This variable test sequence is then utilized to test a system based on a testing scenario.

Embodiments of the present technology enable reusable stand-alone pieces-of-code to be arbitrarily combined within a framework in different ways so as to cover different scenarios, while being subject to tester-defined conditions. The stand-alone pieces-of-code can be dynamic in nature, which avoids the pesticide paradox problem associated with a static test. Furthermore, since the stand-alone pieces-of-code are configured to be reusable, any enhancements to stand-alone pieces-of-code may be employed by any users of the testing system. Hence, alternative embodiments of the present technology permit stand-alone pieces-of-code to be reused, easy to up-date due to its' dynamic nature, and constrained and controlled for more focused testing.

DESCRIPTION OF THE DRAWINGS

The accompanying drawings, which are incorporated in and form a part of this specification, illustrate embodiments of the technology for providing a method for testing a system and, together with the description, serve to explain the principles discussed below:

FIG. 3 is a flowchart of an example method for testing a system in accordance with one embodiment of the present technology.

FIG. 4 is a flowchart of an example method for building a database for testing a system in accordance with one embodiment of the present technology.

The drawings referred to in this description should be understood as not being drawn to scale except if specifically noted.

DETAILED DESCRIPTION

Reference will now be made in detail to embodiments of the present technology for providing a method for testing a system, examples of which are illustrated in the accompanying drawings. While the technology for providing a method for testing a system will be described in conjunction with various embodiments, it will be understood that they are not intended to limit the present technology for providing a method for testing a system to these embodiments. On the contrary, the present technology for providing a method for testing a system is intended to cover alternatives, modifications and equivalents, which may be included within the spirit and scope the various embodiments as defined by the appended claims.

Furthermore, in the following detailed description, numerous specific details are set forth in order to provide a thorough understanding of the present technology for providing a method for testing a system. However, the present technology for providing a method for testing a system may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "accessing", "selecting", "generating", "utilizing", "storing", "reusing", "choosing", "segmenting", "determining", and "receiving" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for providing a method for testing a system is also well suited to the use of other computer systems such as, for example, optical and mechanical computers.

Example Computer System Environment

Figure 1:
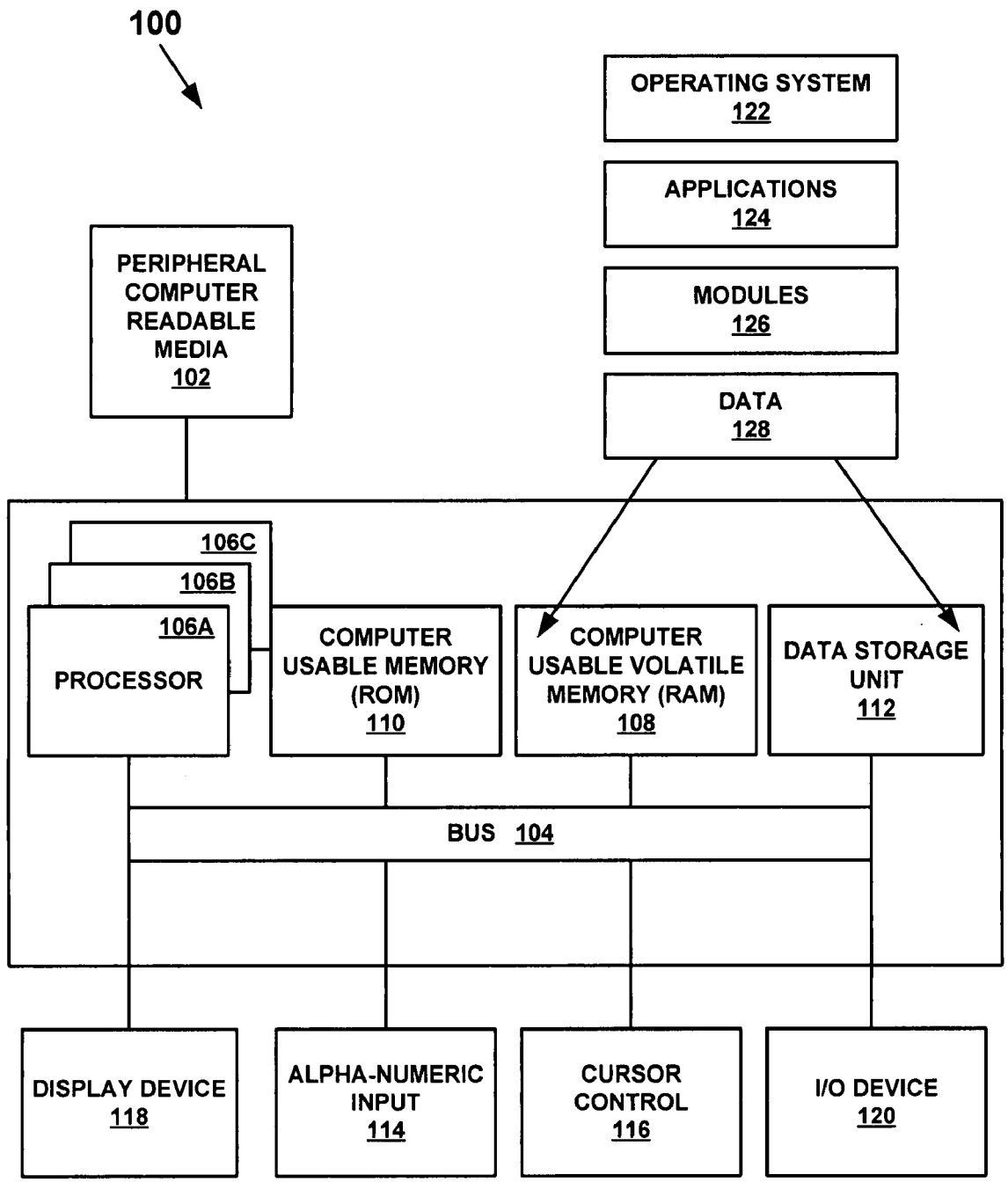
FIG. 1 is a diagram of an example computer system used in accordance with embodiments of the present technology for providing a method for testing a system.

With reference now to FIG. 1, portions of the technology for providing a method for testing a system are composed of computer-readable and computer-executable instructions that reside, for example, in computer-usable media of a computer system. That is, FIG. 1 illustrates one example of a type of computer that can be used to implement embodiments, which are discussed below, of the present technology for providing a method for testing a system.

FIG. 1 illustrates an example computer system 100 used in accordance with embodiments of the present technology for providing a method for testing a system. It is appreciated that system 100 of FIG. 1 is an example only and that the present technology for providing a method for testing a system can operate on or within a number of different computer systems including general purpose networked computer systems, embedded computer systems, routers, switches, server devices, consumer devices, various intermediate devices/artifacts, stand alone computer systems, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C.

System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 of FIG. 1 may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands.

System 100 is also well suited to having a cursor directed by other means such as, for example, voice commands. System 100 also includes an I/O device 120 for coupling system 100 with external entities. For example, in one embodiment, I/O device 120 is a modem for enabling wired or wireless communications between system 100 and an external network such as, but not limited to, the Internet. A more detailed discussion of the present technology for providing a method for testing a system is found below.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. However, it is appreciated that in some embodiments, operating system 122 may be stored in other locations such as on a network or on a flash drive; and that further, operating system 122 may be accessed from a remote location via, for example, a coupling to the internet. In one embodiment, the present technology for providing a method of testing a system, for example, is stored as an application 124 or module 126 in memory locations within RAM 108 and memory areas within data storage unit 112. The present technology for providing a method of testing a system may be applied to one or more elements of described system 100. For example, a method for testing a system may be applied to operating system 122, applications 124, modules 126, and/or data 128.

The computing system 100 is only one example of a suitable computing environment and is not intended to suggest any limitation as to the scope of use or functionality of the present technology. Neither should the computing environment 100 be interpreted as having any dependency or requirement relating to any one or combination of components illustrated in the example computing system 100.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Overview

As an overview, in one embodiment, the present technology provides a method for utilizing a database's stand-alone pieces-of-code for testing a system. Moreover, in one embodiment the stand-alone pieces-of-code are provided such that a testing apparatus can easily combine and reuse the stand-alone pieces-of-code. The testing apparatus of the present technology may also combine disparate pieces-of-code in a focused manner to create variable test sequences. These variable test sequences are then applied to a system.

Architecture

Figure 2A:
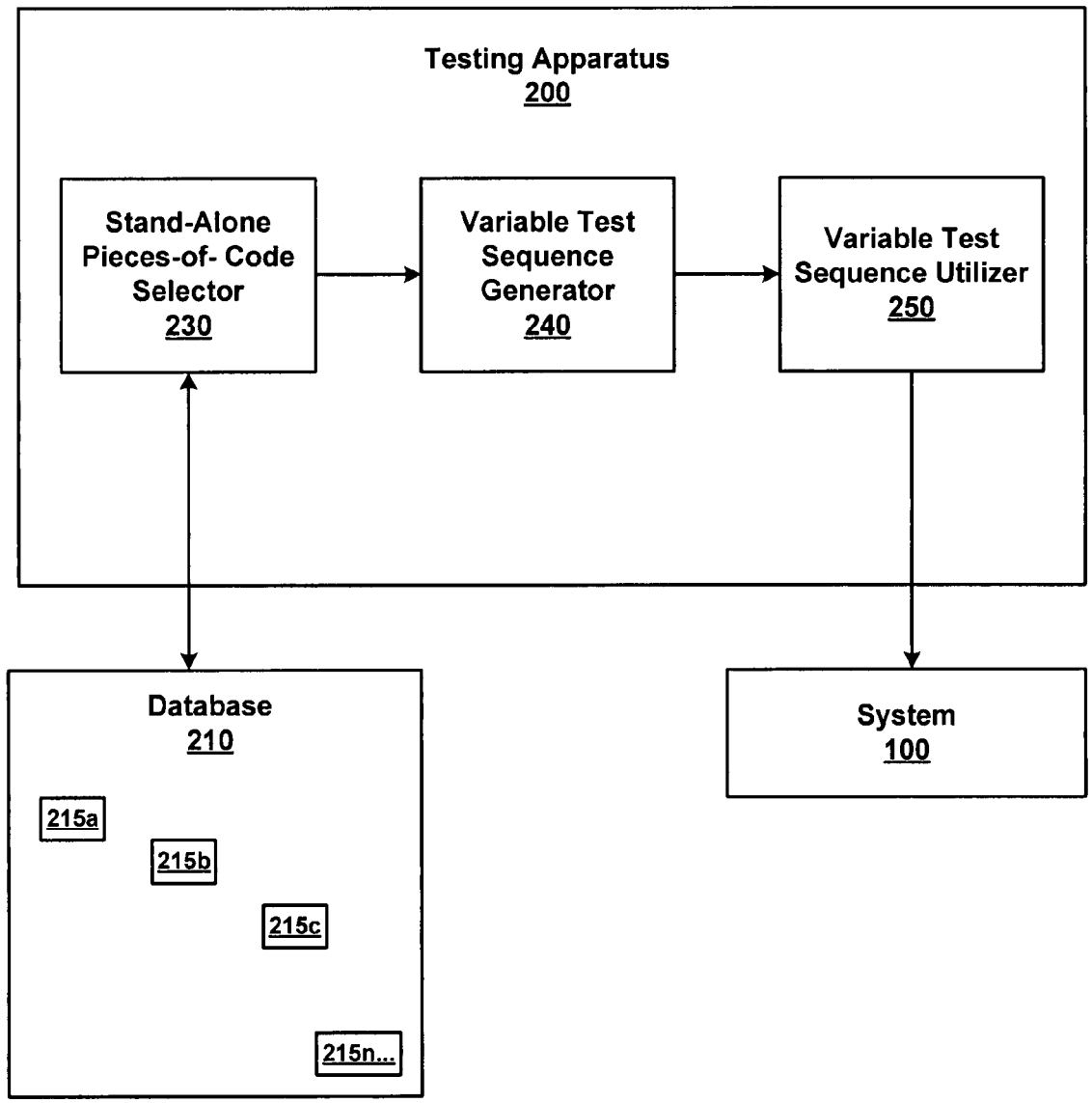
FIG. 2A is a block diagram of an example testing apparatus for testing a system in accordance with one embodiment of the present technology.

With reference now to FIG. 2, a block diagram of an example testing apparatus 200 is shown in accordance with one embodiment of the present technology. In general, testing apparatus 200 includes a stand-alone piece-of-code selector 230, a variable test sequence generator 240, and a variable test sequence utilizer 250, all communicatively coupled to database 210 which includes one or more disparate stand-alone pieces-of-codes 215a, 215b, 215c, 215 . . . n, and to system 100.

Stand-alone pieces-of-code 215 . . . n represents a predetermined number of stand-alone pieces-of-code besides that of pieces-of-code 215a, 215b, or 215c. For example, there may be just one stand-alone piece-of-code represented by 215a, twenty five stand-alone pieces-of-code represented by 215a through 215y, or any number over twenty five stand-alone pieces-of-code represented by 215 . . . n.

In one embodiment, stand-alone pieces-of-code 215 . . . n are reusable pieces-of-code that perform a sequence of operations. In one embodiment, each stand-alone pieces-of-code 215 . . . n may contain any number of sequences of operations to be performed on system 100. For example, stand-alone piece-of-code 215a may contain one sequence of operations, or it may contain 1000 sequences of operations. There may be any number of stand-alone pieces-of-code 215 . . . n within database 210.

Referring again to FIG. 2, stand-alone pieces-of-code 215 . . . n have an operator configured to perform an action to a system to generate an operator test result. This operator then checks that the results are as expected. In another embodiment, stand-alone pieces-of-code 215 . . . n have a verifier configured to check the accuracy of at least a part of system 100.

Referring still to FIG. 2, stand-alone pieces-of-code 215 . . . n have one or more sets of variations. A variation is configuration information for a particular stand-alone piece-of-code. A variation can either be forced or variable. A forced variation always has the same value, while a variable variation has one of a set of possible values.

Referring now to 230 of FIG. 2 and to FIG. 1, in one embodiment, stand-alone pieces-of-code selector 230 is configured to access database 210 having a plurality of stand-alone pieces-of-code 215 . . . n. Additionally, stand-alone pieces-of-code selector 230 is configured to select one or more of a plurality of stand-alone pieces-of-code 215 . . . n, of database 210 to generate a set of at least two stand-alone pieces-of-code 215 . . . n, based on a testing scenario.

In general, the term testing scenario describes a targeted search area and environment which a user wishes to test. Factors to be considered regarding a targeted search area and testing environment include, but are not limited to, the following: time constraints; search space breadth (set of all sequences of operations possible to test); importance of specific areas of the search space; desire to perform an arbitrary application of a test to a specific search area; desire to perform repeatable tests; and the operations needed to connect stand-alone pieces-of-code 215 . . . n in order to perform a test.

In one embodiment, the stand-alone pieces-of-code selector 230 receives input for selecting the pieces-of-code from an operating system such as operating system 122 of FIG. 1. For example, operating system 122 is pre-programmed to analyze the targeted search area and testing environment in order to determine what testing scenario should be applied. Operating system 122 then provides the criteria to stand-alone pieces-of-code selector 230.

In still another embodiment, the stand-alone pieces-of-code selector 230 receives input for selecting the pieces-of-code from a user. A user may enter input regarding a particular selection of stand-alone pieces-of-code 215 . . . n, by any number of means described in FIG. 1. For example, a user may use alpha-numeric input 114 to enter choices regarding the selection of stand-alone pieces-of-code 215 . . . n. Input may also be entered via I/O device 120, cursor control 116, voice commands, etc.

Additionally, stand-alone pieces-of-code selector 230 selects and uses operations such as but not limited to addition, subtraction, multiplication, and division to connect stand-alone pieces-of-code 215 . . . n in order to perform intended tests.

Referring again to FIG. 2, in one embodiment, variable test sequence generator 240 is configured to generate a variable test sequence from a set of at least two stand-alone pieces-of-code 215 . . . n, based on a testing scenario. For example, after stand-alone pieces-of-code selector 230 sends its selection to variable test sequence generator 240, variable test sequence generator 240 generates one or more variable test sequences. Another name for a variable test sequence is a 'pipeline'. Additionally, another name for a reusable stand-alone piece-of-code is a 'component'.

Figure 2B:
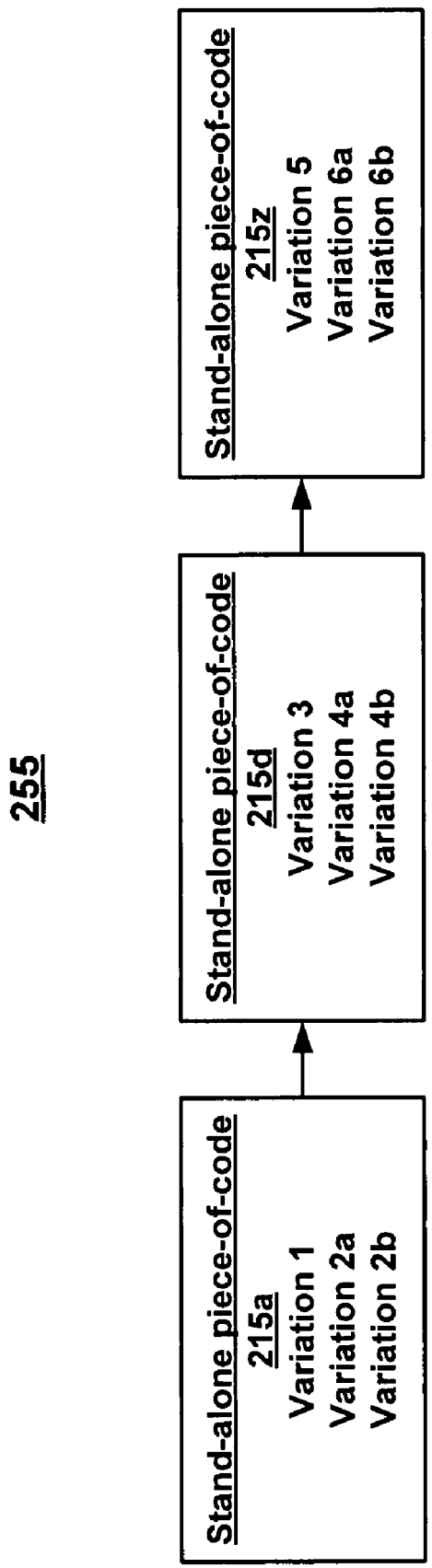
FIG. 2B is a block diagram of an example scenario definition in accordance with one embodiment of the present technology.

Referring now to FIG. 2B, 255 is an example scenario definition in accordance with one embodiment of the present technology. For example, assume that stand-alone pieces-of-code selector 230 selects stand-alone pieces-of-code 215a, 215d, and 215z. Stand-alone piece-of-code 215a has a forced variation 1, and a variable variation 2a and 2b. Stand-alone piece-of-code 215d has a forced variation 3 and a variable variation 4a and 4b. Stand-alone piece-of-code 215z has a forced variation 5 and a variable variation 6a and 6b.

A combination of stand-alone pieces-of-code, such as 215a, 215d, and 215z, is called a scenario definition. A scenario definition is a particular combination of scenario stand-alone pieces-of-code. Scenario stand-alone pieces-of-code are stand-alone pieces-of-code with one or more sets of variations.

Figure 2C:
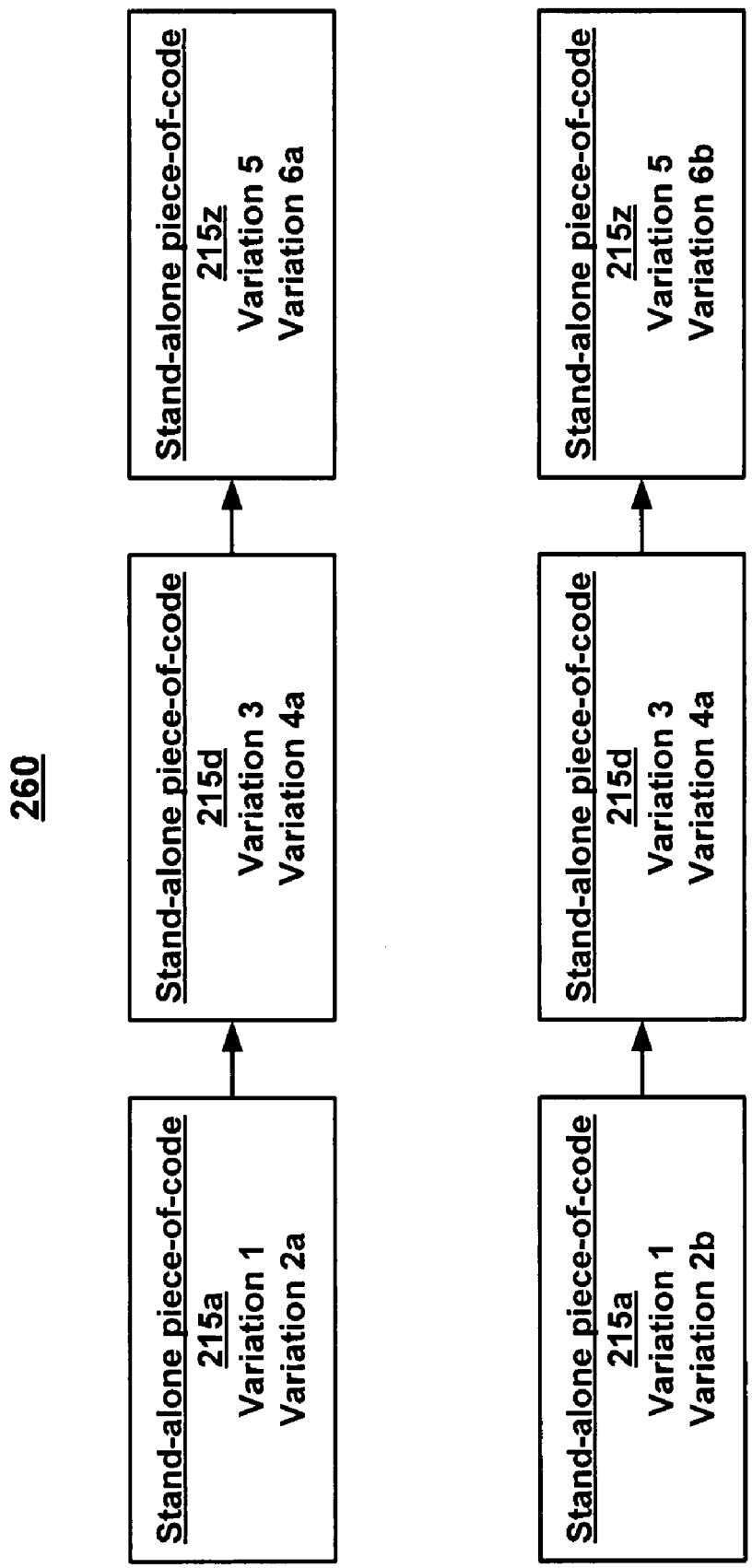
FIG. 2C is a block diagram of two example pipelines generated by the scenario definition described in FIG. 2B, in accordance with one embodiment of the present technology.

Referring now to FIG. 2C, 260 are two example pipelines generated by the scenario definition described in FIG. 2B. For example, from the scenario definition of FIG. 2B, there are eight possible variable test sequences that may be generated by variable test sequence generator 240. For example, one variable test sequence (or pipeline) may be the following: stand-alone pieces-of-code 215a has forced variation 1 along with variable variation 2a; stand-alone pieces-of-code 215d has forced variation 3 along with variable variation 4a; and stand-alone pieces-of-code 215z has forced variation 5 along with variable variation 6a. Another variable test sequence (or pipeline) may be the following: stand-alone pieces-of-code 215a has forced variation 1 along with variable variation 2b; stand-alone pieces-of-code 215d has forced variation 3 along with variable variation 4a; stand-alone pieces-of-code 215z has forced variation 5 along with variable variation 6b.

Scenario stand-alone pieces-of-code 215 . . . n may be made up of the following two classes: operators and verifiers. Referring to FIG. 2, in one embodiment stand-alone pieces-of-code 215 . . . n have an operator configured to perform an action to a system to generate an operator test result. This operation then checks that the results are as expected. In another embodiment, stand-alone pieces-of-code 215 . . . n have a verifier configured to check the accuracy of at least a part of system 100.

Referring again to FIG. 2 and to FIG. 1, in one embodiment variable test sequence utilizer 250 utilizes the variable test sequence to test system 100 based on a testing scenario. For example, variable test sequence utilizer 250 performs the above described variable test sequences generated by variable test sequence generator 240 on test system 100.

System 100 may be any part of example computer system 100 that may be tested for expected results and/or accuracy. For example, variable test sequences may be executed on operating system 122, applications 124, modules 126, and or/data 128.

In one embodiment, testing apparatus 200 has a variable test sequence store which is configured to store a record of a variable test sequence for repeatability. In another embodiment, testing apparatus 200 generates a summary of a test result. For example, after variable test sequence utilizer 250 executes variable test sequences upon system 100, test results are generated. A summary of the test result is generated and sometimes stored. Then this summary of a test result may be accessed by stand-alone pieces-of-code selector 230.

Operation

With reference now to FIG. 3, a flowchart 300 of an example method of testing a system is shown in accordance with one embodiment of the present technology.

Referring now to 305 of FIG. 3 and to FIG. 2, one embodiment accesses a database 210 having a plurality of stand-alone pieces-of-code 215 . . . n, wherein each piece-of-code includes a sequence of operations to be performed on system 100.

Referring now to 310 of FIG. 3 and to FIG. 2, one embodiment selects one or more of a plurality of stand-alone pieces-of-code 215 . . . n within database 210 to generate a set of at least two stand-alone pieces-of-code, based on a testing scenario. For example, stand-alone pieces-of-code selector 230 accesses database's 210 full assortment of stand-alone pieces-of-code 215 . . . n in order to make its decision as to which stand-alone pieces-of-code to choose to be part of a scenario. Stand-alone pieces-of-code selector 230 makes this decision based upon a testing scenario.

A testing scenario describes a targeted search area and environment which a user wishes to test. Factors to be considered regarding a targeted search area and testing environment include, but are not limited to, the following: time constraints; search space breadth (set of all sequences of operations possible to test); importance of specific areas of the search space; desire to perform an arbitrary application of a test to a specific search area; the desire to perform repeatable tests; and the operations needed to connect stand-alone pieces-of-code 215 . . . n in order to perform a test. For example, stand-alone pieces-of-code selector 230 selects and uses operations such as, but not limited to, the following: addition; subtraction; multiplication; and division to connect stand-alone pieces-of-code 215 . . . n in order to perform intended tests regarding calculator functions.

In one embodiment, stand-alone pieces-of-code selector 230 chooses a sequence of operations to be performed on system 100 based upon a functionality of stand-alone pieces-of-code 215 . . . n. For example, the functionality of stand-alone pieces-of-code 215 . . . n may relate to the following: what system 100 provides; and what a user anticipates to be an expectation from people who would want to reuse stand-alone pieces-of-code 215 . . . n. For example, in testing a PDA's addition functions of its integrated calculator, the code selector 230 chooses stand-alone pieces-of-code 215 . . . n which contain negative numbers, along with an addition operation. In this manner, a PDA calculator's addition functions relating to negative numbers may be tested.

In another embodiment, a stand-alone pieces-of-code selector 230 makes a selection of one or more of a plurality of stand-alone pieces-of-code 215 . . . n based on input from operating system 122. For example, operating system 122 is pre-programmed to analyze the targeted search area and testing environment in order to determine what scenario to select. Stand-alone pieces-of-code selector 230 is communicatively coupled to operating system 122, and receives guidance based on the scenario determined by operating system 122.

In still another embodiment of the present technology, stand-alone pieces-of-code selector 230 makes a selection of one or more of a plurality of stand-alone pieces-of-code 215 . . . n based on user input. A user may enter input regarding a particular selection of stand-alone pieces-of-code 215 . . . n, by any number of means described in FIG. 1. For example, a user may use alpha-numeric input 114 to enter choices regarding the selection of stand-alone pieces-of-code 215 . . . n. Input may also be entered via I/O device 120, cursor control 116, voice commands, etc.

Referring now to 315 of FIG. 3 and to FIG. 2, one embodiment generates a variable test sequence from the set of at least two stand-alone pieces-of-code 215 . . . n. For example, after stand-alone pieces-of-code selector 230 selects a scenario as described above, stand-alone pieces-of-code selector 230 sends this scenario made up of a particular combination of scenario stand-alone pieces-of-code to variable test sequence generator 240. Variable test sequence generator 240 then uses this scenario to generate one or more variable test sequences. FIGS. 2B and 2C described herein provide an example of a scenario selection, and variable test sequences being generated.

With reference now to 320 of FIG. 3 and to FIG. 2, one embodiment of the present technology utilizes a variable test sequence to test a system based on a testing scenario. For example, after variable test sequence generator 240 sends a variable test sequence to variable test sequence utilizer 250, variable test sequence utilizer 250 executes the variable test sequence on system 100.

One embodiment of the present technology provides a method for testing a system involving storing a record of an executed variable test sequence. For example, after variable test sequence utilizer 250 executes a variable test sequence on a system I00, the executed variable test sequence is stored on testing apparatus 200 or on an element communicatively coupled with testing apparatus 200.

After database 210 stores a variable test sequence, testing apparatus 200 may access database 210 and its recorded executed variable test sequence. Furthermore, testing apparatus 200 may then reuse the variable test sequence which has already been executed and recorded in order to provide a repeatable test. For example, a user may want to repeat a test in order to test a particular function of a system that previously did not provide an expected result after the first variable test sequence was executed. Therefore, the user would want to access database 210 and retrieve a specific recorded variable test sequence in order to have variable test sequence utilizer 250 execute this same specific certain variable test sequence upon system 100 or other system.

In another embodiment of the present technology, a summary of a test result generator of testing apparatus 200 generates a summary of the test result after variable test sequence utilizer 250 executes a variable test sequence upon system 100. Furthermore, the present technology provides a record of the summary of the test result. In another embodiment the summary of the test result is stored by a summary of a test result store. However, this generated summary of the test result may be stored on database 210 or some other element communicatively coupled to example computing system 100. This summary of the test result may be accessed by for example, stand-alone pieces-of-code selector 230. Stand-alone pieces-of-code selector 230 might access this summary of a test result in order to determine if a test needs to be repeated so as to check for expected results and/or accuracy.

With reference now to FIG. 4, a flowchart 400 of instructions on a computer-usable medium wherein the instructions when executed cause a computer system to perform a method for building database 210 for testing system 100 is shown in accordance with one embodiment of the present technology.

Referring now to 405 of FIG. 4 and to FIG. 2, one embodiment segments a sequence of operations into a plurality of stand-alone pieces-of-code 215 . . . n, wherein stand-alone pieces-of-code 215 . . . n is configured to operate with at least one other stand-alone pieces-of-code 215 . . . n. The term 'segments' refers to the compartmentalization of pieces-of-code according to expected functionality of each particular stand-alone pieces-of-code.

For example, if a user anticipates that a calculator's functions will be tested using stand-alone pieces-of-code, the user will utilize the full range of possible operating functions to segment these functions into individual compartments. For example, if the user anticipates testing the addition function of a calculator, the user may segment the sequence of operations into a stand-alone piece-of-code 215a containing positive numbers, stand-alone piece-of-code 215b containing negative numbers, stand-alone piece-of-code 215c containing decimal numbers, and stand-alone piece-of-code 215d containing hexadecimal numbers.

Referring now to 410 of FIG. 4 and to FIG. 2, one embodiment determines a class type of at least one of a plurality of stand-alone pieces-of-code 215 . . . n based upon a functionality of stand-alone pieces-of-code 215 . . . n. For example, functionality of stand-alone pieces-of-code 215 . . . n may be based on factors such as: what system 100 provides; and what a user anticipates the expectations are from people who want to reuse stand-alone pieces-of-code 215 . . . n. Class type refers to a label associated with the type of functions performed by stand-alone pieces-of-code 215 . . . n, such as functions relating to addition, subtraction, decimal points, multiplication, division, etc.. In addition, class type may refer to a label associated with the type of information contained within stand-alone pieces-of-code 215 . . . n.

For example, a class type may be one involving decimal numbers and one involving hexadecimal numbers. All of the numbers within stand-alone pieces-of-code 215a are decimal numbers, and all of the numbers within stand-alone pieces-of-code 215f are hexadecimal numbers. When testing the multiplication function of a calculator on a PDA, a stand-alone pieces-of-code selector 230 may choose stand-alone pieces-of-code 215a, a multiplication operation, and then stand-alone pieces-of-code 215f.

Referring now to 415 of FIG. 4 and to FIG. 2, one embodiment stores stand-alone pieces-of-code 215 . . . n. For example, these stand-alone pieces-of-code 215 . . . n may be stored on database 210.

Referring now to 420 of FIG. 4 and to FIG. 2, in one embodiment stand-alone pieces-of-code selector 230 accesses a database 210 in order to select at least some number of stand-alone pieces-of-code 215 . . . n based on the testing scenario of system 100 in order to define a testing condition. Testing condition refers to a scenario chosen by stand-alone pieces-of-code selector 230.

In one embodiment of the present technology, performing a method for building database 210 for testing system 100 includes database 210 storing stand-alone pieces-of-code 215 . . . n based on class type.

In one embodiment, performing a method for building database 210 for testing system 100 includes database 210 receiving a variable test sequence from a variable test sequence store. For example, database 210 receives a variable test sequence from another element of testing apparatus 200 or from a source external to testing apparatus 200. The variable test sequence store stores a variable test sequence. The variable test sequence store may be integrated within testing apparatus 200 or may be external to and communicatively coupled to testing apparatus. The variable test sequence store receives variable test sequences from one or more of the elements of testing apparatus 200, such as variable test sequence generator 240, variable test sequence utilizer 250, or even system 100 itself.

Thus, the present technology provides a computer implemented method for testing system 100. Moreover, the present technology's enablement of testing apparatus 200 to selectively combine and reuse already developed stand-alone pieces-of-code 215 . . . n reduces the time it takes to develop and run a test on system 100. Since stand-alone pieces-of-code 215 . . . n are reusable, any enhancements to individual stand-alone pieces-of-code 215 . . . n are usable by any of the users of pieces-of-code 215 . . . n. Additionally, the present technology enables a tester to focus a test on a section of system's 100 broad search space so that important dimensions of a search space are covered, considering the limited time and resources available for the test. Furthermore, the present technology enables a test to be repeated. Repeating tests enables a system to debug a problem as well as to determine if a bug is fixed.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method for testing a system, said method comprising:
   accessing a database having a plurality of stand-alone pieces-of-code, wherein each piece-of-code includes a sequence of operations to be performed on the system;
   selecting one or more of said plurality of stand-alone pieces-of-code within said database to generate a set of at least two stand-alone pieces-of-code, based on a testing scenario;
   generating a variable test sequence from said set of at least two stand-alone pieces-of-code; and
   utilizing said variable test sequence to test said system based on said testing scenario.

2. The computer implemented method of claim 1 further comprising:
   storing a record of said variable test sequence.

3. The computer implemented method of claim 2 further comprising:
   accessing a database having a stored record of said variable test sequence.

4. The computer implemented method of claim 2 further comprising:
reusing said variable test sequence so as to provide a repeatable test.

5. The computer implemented method of claim 1 further comprising:
generating a summary of a test result.

6. The computer implemented method of claim 5 further comprising:
accessing a record of said summary of a test result, wherein said record is stored by a summary of a test result store.

7. The computer implemented method of claim 1 wherein said selecting one or more of said plurality of stand-alone pieces-of-code within said database to generate a set of at least two stand-alone pieces-of-code, based on a testing scenario further comprises:
choosing said sequence of operations to be performed on the system based upon a functionality of said stand-alone pieces-of-code.

8. The computer implemented method of claim 1 wherein said selecting one or more of said plurality of stand-alone pieces-of-code within said database to generate a set of at least two stand-alone pieces-of-code, based on a testing scenario further comprises:
utilizing an operating system to make a selection of said one or more of said plurality of stand-alone pieces-of-code.

9. The computer implemented method of claim 1 wherein said selecting one or more of said plurality of stand-alone pieces-of-code within said database to generate a set of at least two stand-alone pieces-of-code, based on a testing scenario further comprises:
utilizing user input to make a selection of said one or more of said plurality of stand-alone pieces-of-code.

10. A testing apparatus, comprising:
a processor; and
storage coupled to the processor, the storage including computer-executable instructions configured to be executed by the processor, the computer-executable instructions comprising:
a stand-alone pieces-of-code selector configured to access a database and select one or more of a plurality of stand-alone pieces-of-code to generate a set of at least two stand-alone pieces-of-code, based on a testing scenario;
a variable test sequence generator configured to generate a variable test sequence from said set of at least two stand-alone pieces-of-code, based on the testing scenario; and
a variable test sequence utilizer configured to utilize said variable test sequence to test said system based on said testing scenario.

11. The testing apparatus of claim 10 further comprising:
a variable test sequence store configured to store a record of said variable test sequence.

12. The testing apparatus of claim 10 further comprising:
a summary of test result generator configured to generate a summary of a test result.

13. The testing apparatus of claim 10 wherein said stand-alone piece-of-code selector further comprises:
an operating system configured to select one or more of said plurality of stand-alone pieces-of-code.

14. The testing apparatus of claim 10 wherein said stand-alone piece-of-code selector further comprises:
user input configured to select one or more of said plurality of stand-alone pieces-of-code.

15. The testing apparatus of claim 10 wherein said stand-alone pieces-of-code further comprises:
an operator configured to perform an action to generate an operator test result and to check said operator test result for accuracy.

16. The testing apparatus of claim 10 wherein said stand-alone pieces-of-code further comprises:
a verifier configured to check the accuracy of at least a part of a system.

17. The testing apparatus of claim 10 wherein said stand-alone pieces-of-code further comprises:
one or more sets of variations.

18. A computer implemented method for building a database of stand-alone pieces-of-code for testing a system, comprising:
segmenting a sequence of operations into a plurality of stand-alone pieces-of-code, wherein a stand-alone piece-of-code is configured to operate with at least one other said stand-alone pieces-of-code;
determining a class type of at least one of said plurality of stand-alone pieces-of-code based upon a functionality of said stand-alone pieces-of-code;
storing said stand-alone piece-of-code; and
utilizing a stand-alone pieces-of-code selector to access said database such that said stand-alone pieces-of-code selector selects at least some number of said stand-alone pieces-of-code based on a system testing scenario in order to define a testing condition.

19. The computer implemented method of claim 18 wherein said storing said stand-alone pieces-of-code further comprises:
storing said stand-alone pieces-of-code based on class type.

20. The computer implemented method of claim 18, further comprising:
receiving a variable test sequence from a variable test sequence store.

* * * * *